March 9, 1954 — E. RICHARDSON — 2,671,270
NAVIGATIONAL INSTRUMENT
Filed April 19, 1947
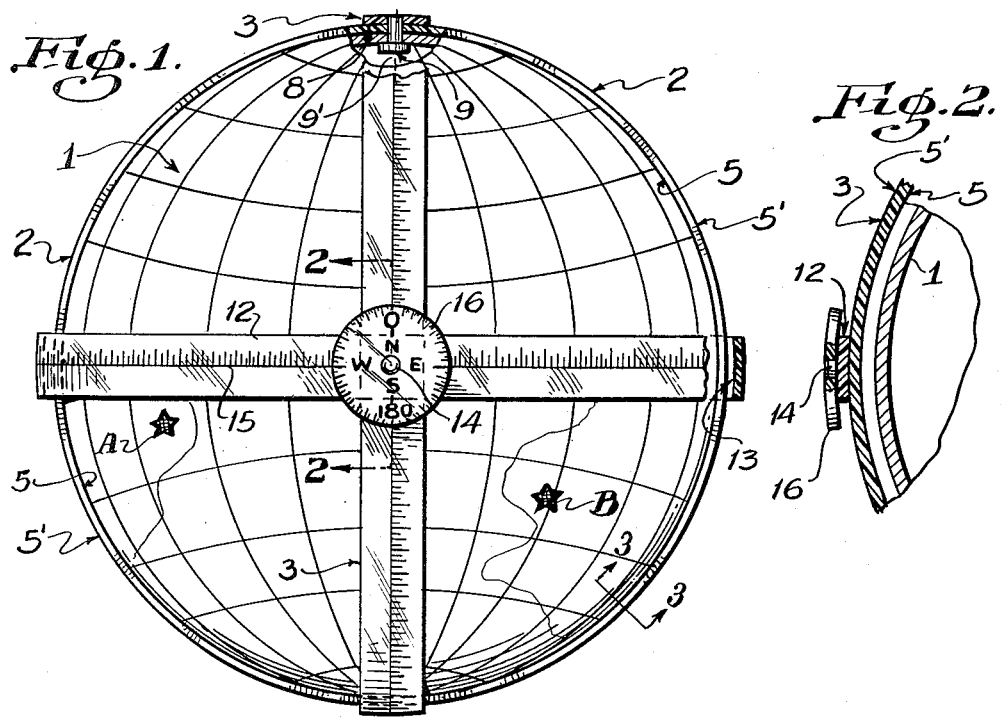
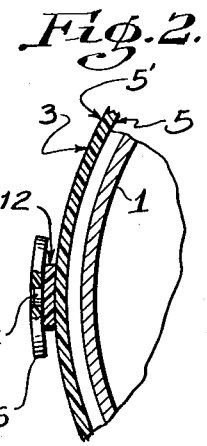
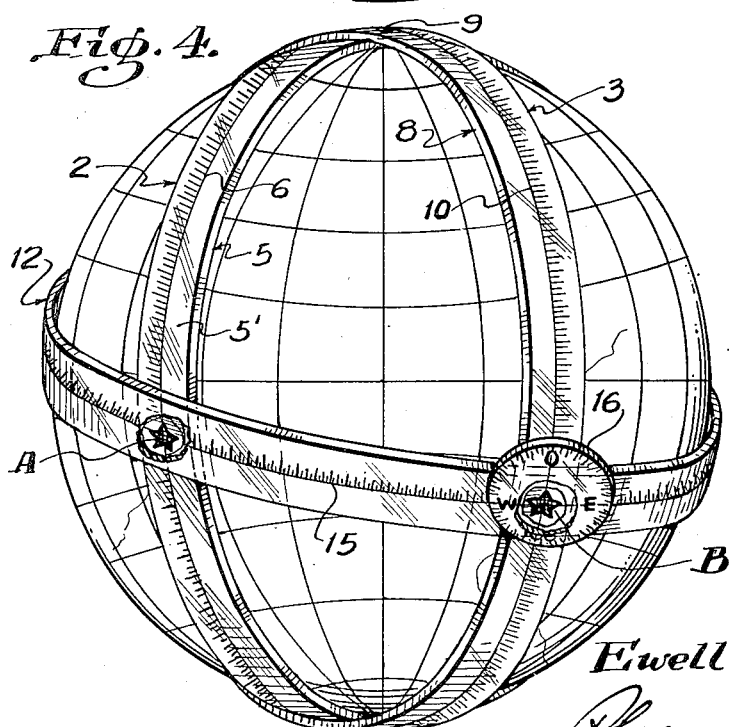
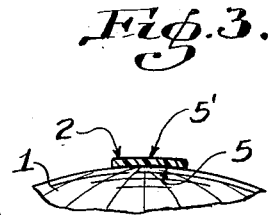
INVENTOR.
Ewell Richardson
BY
ATTORNEY.

Patented Mar. 9, 1954

2,671,270

UNITED STATES PATENT OFFICE 2,671,270

NAVIGATIONAL INSTRUMENT

Ewell Richardson, Los Angeles, Calif.

Application April 19, 1947, Serial No. 742,502

1 Claim. (Cl. 33—1)

This invention relates to the design of a terrestrial globe and to attachments for terrestrial globes whereby the great circle track between any two points on the globe, either meridian or non-meridian in nature, may be plotted upon the globe. The device of my invention can be employed for determining the compass direction or the azimuthal bearing of any such great circle in respect to any point on said great circle.

Another object which is accomplished by the device of my invention is to determine the longitude and latitude of any position on any great circle plotted upon such a globe.

Another object which is accomplished by the design of my invention hereinafter described is to determine the angular distance or the distance in miles between any two points upon a great circle.

While the device of my invention is useful as an educational instrument or useful as an attachment to a terrestrial globe however employed, it is particularly useful in navigation either aerial or at sea.

My invention will be further described in connection with the drawing, in which

Fig. 1 shows the mounting of the annular circles upon a terrestrial globe according to my invention;

Fig. 2 is a section taken along the line 2—2 of Fig. 1;

Fig. 3 is a section taken along the line 3—3 of Fig. 1;

Fig. 4 shows a specific application of my invention showing how it may be employed.

The globe 1 may be an ordinary terrestrial globe. Mounted upon the globe is a band 2 which makes a snug but slidable fit with the globe 1. The band 2 is curved transversely to give an inner surface 5 having a radius of curvature equal to the radius of curvature of the globe so that the band fits snugly against the surface of the globe, the inner surface 5 fitting the outer surface globe 1. The outer surface 5' of the band 2 is concentric with the inner surface 5. The band 2 is thus an annular spherical zone having an inner diameter equal to the diameter of the globe 1. A second band 3 is mounted upon the band 2. The inner diameter of the band 3 is equal to the outer diameter of the spherical surface of the annular spherical zone band 2. It is also curved at 8 transversely at a radius of curvature equal to the radius of the outer surface of the band 2 so that the inner surface 8 of the band 3 makes a snug and slidable fit with the outer surface of the band 2. The outer spherical surface of 3 is concentric with the inner surface of 3 and all inner and outer surfaces of the bands 2 and 3 are thus concentric with the globe. Bands 2 and 3 are thus annular spherical zones.

Each of the bands 2 and 3 is preferably made of a transparent material such as one of the transparent plastics, for example, the methyl methacrylate plastics such as are well known and which need not be further described. They are each scribed with a line intersecting the diameter of the annular spherical zones. Thus, band 2 is scribed with the line 6 and band 3 is scribed with the line 10. The lines are marked in degrees and fractions of a degree, indicating north and south latitude. These lines are thus concentric with equivalent global great circles.

The bands 2 and 3 are rotatably mounted upon the globe by means of a pivot pin 9, the center line 9' of which passes through the north pole of the globe and intersects the bands 2 and 3 at the lines 6 and 10, respectively. They may also be mounted in like fashion by a pin, the center line of which passes through the south pole of the globe and intersects the lines 6 and 10.

A third annular spherical zone band 12 having an inner diameter equal to the outer diameter of the band 3 is mounted over the band 3. The inner surface of the annular spherical zone band 12, as shown at 13, has a radius of curvature equal to the radius of the outer surface of the annular spherical zone band 3. It is thus of a spherical inner surface concentric with the globe and with the annular spherical sector bands 2 and 3. The inner surface 13 thus makes a snug and sliding fit over the outer surface of 3. The band 12 is scribed with a circle 15 intersecting the diameter of the annular spherical zone band 12 and is thus concentric with equivalent great circles of the globe 1. The circle 15 is marked with angular degrees and fractions of the degrees of east and west longitude.

Mounted on the band 12 is a pivot pin 14 the center line of which intersects the line 15, and rotatably mounted on the pivot pin 14 is a spherical protractor 16 which is concentric with and in contact with the outer surface of band 12 and rotatable about an axis at a point where the center line of 14 intersects the line 15. The protractor may be divided in degrees and also may be provided with compass markings and may be made of a transparent material such as the plastics previously referred to.

The annular bands may be mounted by splitting the bands and assembling them by opening up the band. When they are mounted in position they may be closed and the ends connected by a suitable plastic cement, as will be understood by those skilled in the plastics art.

The bands 2 and 3 are pivoted at the poles and may be termed meridional bands, since the lines 6 and 10 are coincident with the meridians. The band 12 is movable to all great circle positions on the globe. Thus when the line 15 is made coincident with any meridian the band 12 is a meridional band and, in fact, line 15 can make a spherical angle with the index line 6 or 10 of the meridional bands, the vertex of which is at the poles and which may be from 0 up to 360° since 12 may be rotated through 360° on 10 and 10 may be made coincident with 6.

However, the band 12 may be slid from such polar positions to a position where the line 15 is at a spherical right angle to either 10 or 15. The band 12 is then an equatorial band.

The band 12 may be adjusted over the face of the globe to various great circle positions between the meridional and the equatorial positions at all acute or obtuse angles to the meridional bands, so that the intersection of the lines 15, 10, and 5 will form spherical triangles which may be right spherical triangles. However, these triangles may also be obtuse or acute, including also the polar triangles thereof, with the band 12 in either an equatorial or non-equatorial position.

This is made possible by the fact that the band 12 is a great circle band freely slidable over the meridional bands to all great circle positions between the equatorial and the meridional positions.

The plotting of a great circle upon the globe may be attained in the following fashion. Suppose we wish to determine the great circle track between points A and B, the longitude and latitude of which are known. I may employ a map printed upon the surface of the globe with the usual meridian lines and the usual latitude lines. I may more accurately determine the position by employing the device as follows:

With band 2 set so that line 6 is coincident with the meridian of Greenwich, that is, the zero longitude, and with the band 12 set so that line 15 is coincident with the equator, with the zero point of line 15 on line 6, band 3 is rotated until line 10 intersects 15 at the longitude of B as read on 12. Holding band 3 in the position thus determined and with 12 at its equatorial position with the zero position of 12 at its previous position on the zero meridian, the annular band 2 is rotated until the longitude of A is obtained where 6 intersects 15. I now have the bands 2 and 3 positioned on the meridians of both A and B. Holding bands 2 and 3 in position, band 12 is moved until the center line of the pin 14 is coincident with line 10 at the latitude of B as read on line 10 and line 15 intersects line 6 at the latitude of A as shown on line 6. I have now established the great circle track between A and B given by line 15.

In order to measure the azimuthal direction or compass bearing of this great circle track, the protractor 16 is rotated until zero or north is coincident with the line 10. The bearing of the great circle track is given by reading the direction of line 15 on the protractor. In like manner, by reading the angular distances between any two points as the great circle track for the divisions on line 15, the distance between such two points is obtainable, as will be understood by those skilled in the art of navigation.

Various modifications of the construction as shown above may be made. Thus instead of band 2 and band 3 being complete circles they may be half circles mounted upon pins 9, both making semi-circular band contact with the globe 1 and curved in the manner specified over a semi-circular great circle arc. The semi-circles 2 and 3 may be made each to snugly fit the globe and make a slidable contact therewith. In this construction lines 6 and 10 of bands 2 and 3 may not approach each other as closely as in the construction illustrated on the drawing because of the interference between the ends of the half bands at the mountings 9.

The term "annular band" as employed herein is meant to include such half bands so mounted.

Instead of fitting band 12 over the annular bands 2 and 3 and mounting the protractor on said band, band 12 may be fitted underneath said bands 2 and 3 and in direct contact with the sphere and the protractor may be mounted upon any one of the bands 2 or 3. I prefer, however, to employ the construction as shown in the drawing.

While I have described a particular embodiment of my invention for the purpose of illustration, it should be understood that various modifications and adaptations thereof may be made within the spirit of my invention as set forth in the appended claim.

I claim:

A device for plotting the great circle track between any two points on a globe, comprising an annular spherical zone band having an inner diameter equal to the diameter of the globe, a line scribed on the outer surface of said band intersecting the said outer diameter of said band, latitude degree markings scribed thereon, a second annular spherical zone band having an inner radius equal to the radius of the outside surface of the first-mentioned band, a line scribed on the outer surface of said second band intersecting the outer diameter of said second band, latitude degree markings scribed thereon, a rotatable pivot mounting for said annular spherical zone bands at the poles of said globe, the pivotal axis of said pivot mounting intersecting said bands at said lines, a third annular zone band fitting over said second band and having an inner diameter substantially equal to the outer diameter of the second band, the outer surface of said third band carrying a line scribed thereon intersecting the outer diameter of said third band, and a protractor rotatably mounted on said third band.

EWELL RICHARDSON.

References Cited in the file of this patent

UNITED STATES PATENTS

| Number | Name | Date |
|---|---|---|
| 651,804 | Houghton | June 12, 1900 |
| 780,225 | Pellehan | Jan. 17, 1905 |
| 1,016,176 | Roca | Jan. 30, 1912 |
| 2,055,148 | Hagner | Sept. 22, 1936 |
| 2,102,413 | Hall | Dec. 14, 1937 |
| 2,151,601 | Johnson | Mar. 21, 1939 |
| 2,183,765 | Coleman | Dec. 19, 1939 |
| 2,374,788 | Steele | May 1, 1945 |
| 2,429,754 | Hagner | Oct. 28, 1947 |
| 2,443,240 | Hagner | June 15, 1948 |
| 2,466,225 | Gee | Apr. 5, 1949 |

FOREIGN PATENTS

| Number | Country | Date |
|---|---|---|
| 3,645 | Great Britain | Jan. 30, 1813 |
| 14,105 | Great Britain | May 1, 1852 |
| 858,116 | France | May 6, 1940 |